C. H. LUTHMAN.
TIE TONGS.
APPLICATION FILED APR. 1, 1915.
1,287,369.
Patented Dec. 10, 1918.
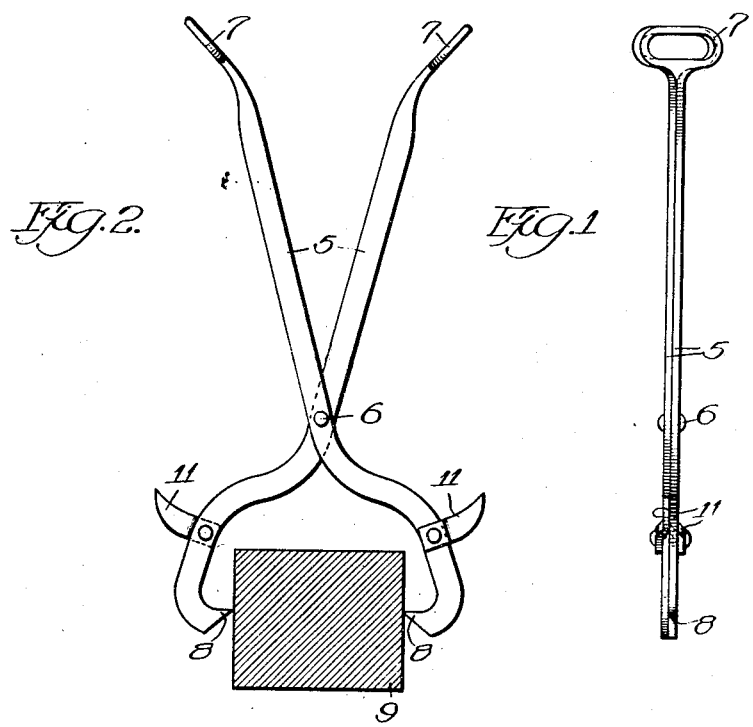
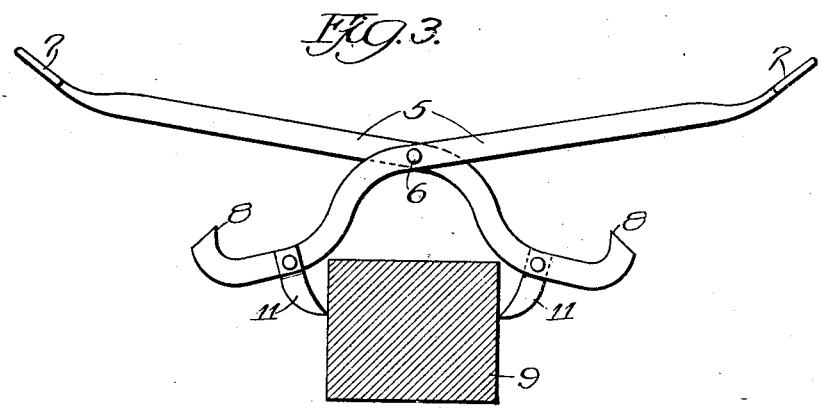

UNITED STATES PATENT OFFICE.

CHARLES H. LUTHMAN, OF HAMMOND, INDIANA, ASSIGNOR, BY DIRECT AND MESNE ASSIGNMENTS, TO NATIONAL SURFACE GUARD COMPANY, OF CHICAGO, ILLINOIS, A CORPORATION OF ILLINOIS.

TIE-TONGS.

1,287,369.  Specification of Letters Patent.  Patented Dec. 10, 1918.

Application filed April 1, 1915. Serial No. 18,526.

*To all whom it may concern:*

Be it known that I, CHARLES H. LUTHMAN, a citizen of the United States, residing at Hammond, in the county of Lake and State of Indiana, have invented certain new and useful Improvements in Tie-Tongs, of which the following is a specification.

This invention relates in general to carrying or holding devices and has more particular reference to tracklaying implements commonly known as tie-tongs, by means of which the wooden ties employed in track construction are lifted and placed in the desired position.

Prior to my invention two sets of tie-tongs have been necessary on each job, one set being so constructed that the handles will project substantially horizontally when the tongs are engaged with a tie, thereby enabling the workmen to lift the tie by the tongs and carry it to the desired position without being interfered with by the tie, since the handles project a considerable distance on each side of the tie. The other set was so constructed that the handles were disposed in substantially vertical position when the tongs were engaged with a tie and these tongs were used in positioning or placing the tie accurately in position.

My present invention has for its primary object the provision of a single implement or tool which will take the place of the two sets of tongs heretofore deemed necessary and can be used both as carrying tongs and as placing tongs, the handles when used as carrying tongs being disposed in approximately horizontal position, and when used as placing tongs being disposed in approximately vertical position.

With this end in view my improved implement is equipped with a plurality of pairs of tie-engaging dogs projecting in opposite directions from the outwardly offset jaws of the tongs so that either pair may be brought into operative position by simply swinging the members to reversed position on their pivot.

For the purpose of facilitating an understanding of my invention I have disclosed one preferred embodiment thereof on the accompanying drawings, throughout the various views of which like reference characters refer to similar parts. Referring to the drawings—

Figure 1 is a side elevation of a pair of tongs embodying my invention;

Fig. 2 is an elevational view showing one application of the tongs to a tie; and Fig. 3 is a similar view showing the tongs in reversed position.

By reference to the drawings it will be observed that my improved tongs comprise a pair of duplicate or similarly shaped members 5 pivotally connected intermediate their ends by a pivot pin or bolt 6. The long handle arms of the levers, formed by pivotally connecting the members together, are straight and are equipped at their outer ends with outwardly turned hand-grips 7 by means of which the tongs are operated and carried. The shorter arms or jaws of the levers are outwardly offset relatively to the handle arms, being shaped substantially as shown in Figs. 2 and 3, and referring more particularly to Fig. 2, the lower ends of the jaws are provided with opposed inwardly projecting tie-engaging devices or teeth 8 adapted to grasp and hold between them a tie 9. When the teeth 8 are engaged with a tie, as shown in Fig. 2, the long arms or handles of the tool project approximately vertically and a considerable distance above the tie, the tongs being adapted for use in moving the tie slightly in bringing it to its final position.

In order to adapt the tongs for carrying purposes I have equipped each of the members 5 intermediate and preferably approximately midway between the pivot 6 and the teeth 8 with a tooth or tie-engaging device 11 which projects in a direction opposite to the projection of the teeth 8. The teeth 11 may be bolted or spot-welded to the members 5 or formed integrally therewith or otherwise rigidly attached thereto. When it is desired to employ the tongs for lifting and carrying purposes the members 5 are swung on their pivot 6 into the reversed position shown in Fig. 3, so as to bring the teeth 11 into coöperative relation with a tie 9, the teeth being then adapted to grasp a tie between them when the outer ends of the handles are lifted. It will be observed that in this position of the tongs the handles are disposed substantially horizontally and project a considerable distance beyond the sides of the tie so that the workmen lifting and carrying the tie by means of the handles will have ample room to walk on each side of the tie. Furthermore, the handles in this position are disposed quite low relatively to the tie so that when the workmen stand erect the tie will be lifted clear of the ground.

I am aware that a grappling tool having jaws that are straight continuations or extensions, below the pivot, of the longer arms or handles and are equipped with inwardly and outwardly extending hooks at different distances from the pivot to enable the tool to be used in the same manner on different sized objects owing to its two-sized grapplers is known; but the tool of my present invention is functionally distinguished therefrom in that it enables the same object to be gripped and manipulated in two different ways, instead of enabling two different sized objects to be gripped and manipulated in one and the same way, and this novel functional capacity of the tool of my present invention is secured by the feature of structural novelty which consists of the outwardly offset jaw members carrying the two sets of oppositely extending teeth whereby when the lower teeth are engaged with a tie or like object the handles are close enough together to be conveniently manipulated by the two hands of a single man, and when the upper teeth are engaged with the same object or another object of substantially the same width the handles are spread wide apart in position to be grasped by the right and left hands respectively of two men, who thus carry the object between them.

It will be obvious from the foregoing that I have combined in a single pair of tongs the functions and desirable features of both types of tongs heretofore considered necessary on a job and that the tongs embodying my invention may be used for carrying a tie to approximately its desired position and thereafter the final placing of the tie may be effected by means of the same tool by simply reversing the members on their pivot, as will be clearly understood.

I claim:

1. An implement of the character described, comprising a pair of tong levers pivoted intermediate their ends, and each consisting of a straight handle portion on one side of said pivot and an outwardly offset jaw portion on the other side of said pivot terminating in an inwardly turned tooth, and outwardly extending teeth on said jaws above said inwardly turned teeth, the construction and relation of said parts being such that the lower teeth may be engaged with a tie with the handle portions close together and approximately vertical, and by inverting the implement and swinging said handle portions to the other side of the pivot and said upper teeth may be engaged with the tie with the handle portions spread to approximately horizontal position.

2. An implement of the character described, comprising a pair of tong levers pivoted intermediate their ends and each consisting of a straight handle portion on one side of said pivot terminating in an outwardly turned hand-grip and an outwardly offset jaw portion on the other side of said pivot terminating in an inwardly turned tooth, and outwardly extending teeth on said jaws approximately midway between the pivot and said inwardly turned teeth, the construction and relation of said parts being such that the lower teeth may be engaged with a tie with the handle portions close together and approximately vertical, and by inverting the implement and swinging said handle portions to the other side of the pivot said upper teeth may be engaged with the tie with the handle portions spread to approximately horizontal position.

CHARLES H. LUTHMAN.

Witnesses:
FRANK D. PREST,
M. A. DOBSON.

Copies of this patent may be obtained for five cents each, by addressing the "Commissioner of Patents, Washington, D. C."